United States Patent
Wang

(10) Patent No.: US 10,747,019 B2
(45) Date of Patent: Aug. 18, 2020

(54) METHOD FOR FABRICATING MULTI-COLOR CELLULOSE ACETATE SPECTACLE FRAME

(71) Applicants: Creative International Concept (CIC) Eyewear Manufacturer Ltd., Shenzhen (CN); Daomin Wang, Shenzhen (CN)

(72) Inventor: Daomin Wang, Shenzhen (CN)

(73) Assignee: CREATIVE INTERNATIONAL CONCEPT (CIC) EYEWEAR MANUFACTURER LTD., Shenzhen (CN)

( * ) Notice: Subject to any disclaimer, the term of this patent is extended or adjusted under 35 U.S.C. 154(b) by 189 days.

(21) Appl. No.: 16/100,525

(22) Filed: Aug. 10, 2018

(65) Prior Publication Data

US 2020/0050015 A1    Feb. 13, 2020

(51) Int. Cl.
| | |
|---|---|
| *G02C 5/00* | (2006.01) |
| *B29D 12/02* | (2006.01) |
| *B29C 69/00* | (2006.01) |
| *B29C 43/20* | (2006.01) |
| *B29K 1/00* | (2006.01) |
| *B29K 105/00* | (2006.01) |

(52) U.S. Cl.
CPC ............ *G02C 5/008* (2013.01); *B29C 43/203* (2013.01); *B29C 69/001* (2013.01); *B29D 12/02* (2013.01); *B29K 2001/12* (2013.01); *B29K 2105/0032* (2013.01); *G02C 2200/12* (2013.01)

(58) Field of Classification Search
CPC ..... B29C 43/203; B29C 69/001; B29D 12/02; B29K 2105/0032; B29K 2001/12; G02C 5/008; G02C 2200/12
USPC .......................................................... 351/41
See application file for complete search history.

(56) References Cited

U.S. PATENT DOCUMENTS 9,776,345 B2 * 10/2017 Orsi Mazzucchelli ...................... B29B 11/10
2017/0106610 A1 * 4/2017 Manera ................. B29C 70/345

FOREIGN PATENT DOCUMENTS

CN    105150549 B    7/2017

* cited by examiner

*Primary Examiner* — Tuyen Tra

(57) ABSTRACT

A method for fabricating a multi-color cellulose acetate spectacle frame, which includes: baking a multi-color cellulose acetate sheet so that it is soften; pressing so as to enable the second, third, and fourth color layers of the multi-color cellulose acetate sheet to move a distance greater than the thickness of a surface color layer of the multi-color cellulose acetate sheet; grinding off or shaving off a surface layer of the excessively moved portion so that the color of a middle layer is highlighted; baking the multi-color cellulose acetate sheet again so that it is soften; pressing so that the color of the middle layer is highlighted to the surface of the spectacle frame. According to the method for fabricating the multi-color cellulose acetate spectacle frame, the working processes are saved, and the qualification rate of product is improved.

9 Claims, 1 Drawing Sheet

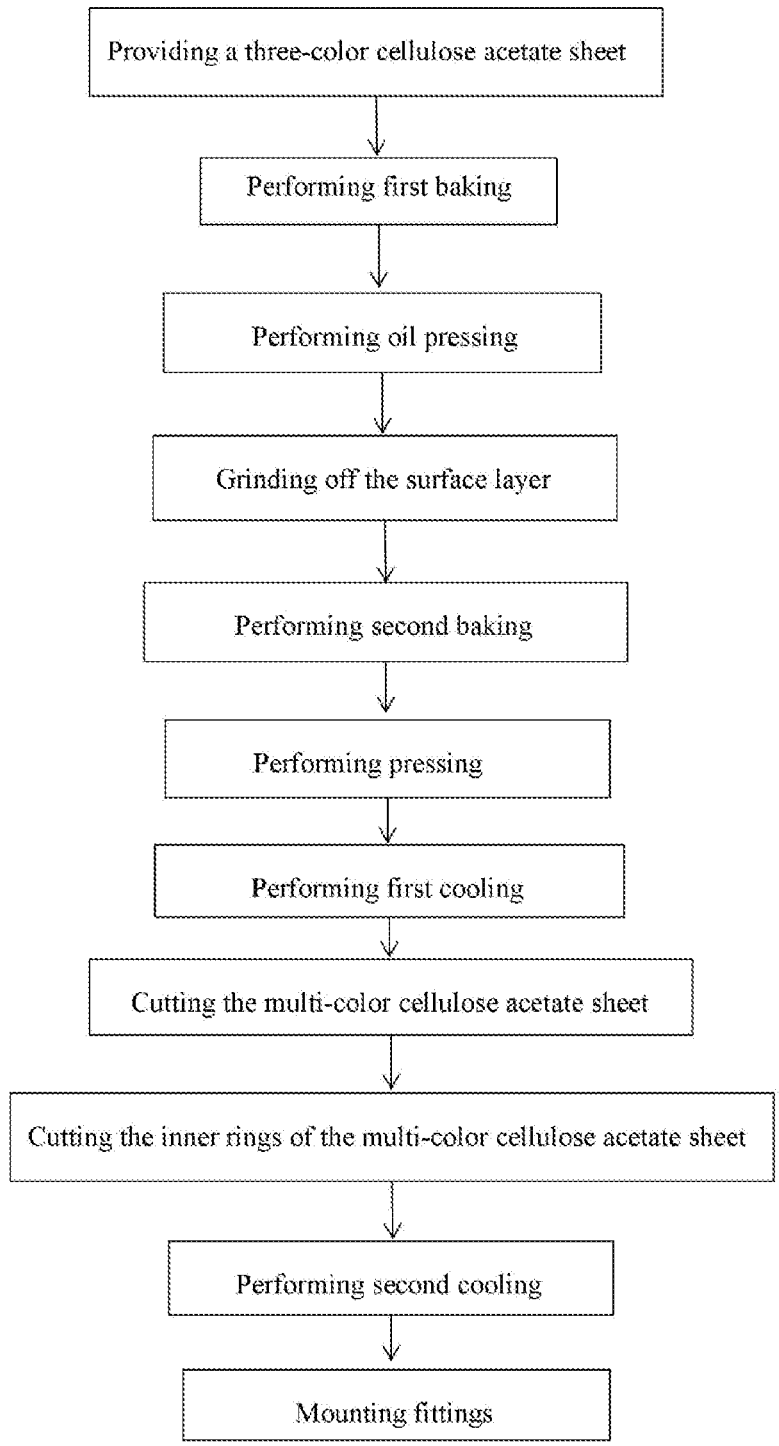

METHOD FOR FABRICATING MULTI-COLOR CELLULOSE ACETATE SPECTACLE FRAME

FIELD

The present invention relates to the technical field of spectacle frame fabrication, and more particularly, to a method for fabricating a multi-color cellulose acetate spectacle frame.

BACKGROUND

Glasses are the daily necessities for vision correction that a person with myopia, hyperopia or presbyopia cannot part with, and are the daily necessities for aesthetics that a person uses to shade his/her body from the sun. The glasses are composed of two lenses and a spectacle frame. The existing spectacle frame is mainly made of a metal or non-metal material.

The metal material has the advantage of easy molding, but has the disadvantages of single color appearance and complicated surface processing.

The non-metal material has the advantages of easy molding and diverse color appearance. Also, the non-metal material is light-weight and has good corrosion resistance. At present, cellulose acetate is widely used as a non-metal material, and has the advantages of light weight, good strength, good corrosion resistance. However, the outer surface of the existing cellulose acetate spectacle frame has a single color, which cannot meet the needs of customers.

The patent No. CN105150549B discloses a method for fabricating a multi-color cellulose acetate spectacle frame. Firstly, a three-color cellulose acetate sheet is cut. After the first baking, the three-color cellulose acetate sheet is placed in a coarse pressing die for pressing, followed by water grinding. After the second baking, the three-color cellulose acetate sheet is placed in a precision pressing die for pressing. And finally, inner rings of the multi-color cellulose acetate sheet are cut out to form a spectacle rim, and spectacle frame fittings are mounted. A portion of the multi-color cellulose acetate sheet is displaced by die pressing, and then, a surface layer of the moved portion is ground off by a water grinder to highlight the color of a middle layer. However, during heating and pressing, the outer ring of the spectacle frame that is cut out will be firstly deformed, and thus it is necessary to repair it in the later stage, which increases the process cost.

SUMMARY

An object of the present invention is to provide a method for fabricating a multi-color cellulose acetate spectacle frame, which can save the working processes and improve the qualification rate of product. The method for fabricating a multi-color cellulose acetate spectacle frame according to the present invention adopts the following technical solution.

A method for fabricating a multi-color cellulose acetate spectacle frame comprises the following steps: providing a multi-color cellulose acetate sheet composed of multiple layers in its thickness direction, each layer having a color; designing and making an oil pressing die; placing the multi-color cellulose acetate sheet in an oven for first baking; placing the multi-color cellulose acetate sheet in the oil pressing die mounted on an oil pressing machine, so as to enable the second, third, and fourth color layers of the multi-color cellulose acetate sheet to move a distance greater than the thickness of a surface color layer of the multi-color cellulose acetate sheet by the oil pressing machine; grinding off or shaving off a surface layer of the excessively moved portion by a water grinder; placing the processed multi-color cellulose acetate sheet in the oven for second baking; placing the baked multi-color cellulose acetate sheet in a precision pressing die of a hydraulic press for pressing, so as to enable the moved portion of the multi-color cellulose acetate sheet to move a certain distance again; placing the multi-color cellulose acetate sheet in a cooling liquid for first cooling; cutting the multi-color cellulose acetate sheet by a CNC engraving and cutting machine; cutting inner rings of the multi-color cellulose acetate sheet by the CNC engraving and cutting machine to form a spectacle rim; placing the multi-color cellulose acetate sheet in the cooling liquid for second cooling; and mounting spectacle frame fittings on the formed spectacle rim.

Preferably, the first baking temperature is 200-210° C., and the baking time is 30-40 seconds.

Preferably, the second baking temperature is 210-250° C., and the baking time is 50-70 seconds.

Preferably, the moved distance of the multi-color cellulose acetate sheet after being pressed in the precision pressing die is less than the thickness of the middle layer to be highlighted.

Preferably, the cooling liquid is water.

The beneficial effects of the method for fabricating the multi-color cellulose acetate spectacle frame according to the present invention are as below. A multi-color cellulose acetate sheet is firstly baked so that it is soften; then, the multi-color cellulose acetate sheet placed in an oil pressing die is pressed by an oil pressing machine, so as to enable the second, third, and fourth color layers of the multi-color cellulose acetate sheet to move a distance greater than the thickness of a surface color layer of the multi-color cellulose acetate sheet. A surface layer of the excessively moved portion is ground off or shaved off, so that the color of a middle layer is highlighted. The multi-color cellulose acetate sheet is baked again so that it is soften, and the multi-color cellulose acetate sheet is pressed by a precision pressing die so that the color of the middle layer is highlighted to the surface of the spectacle frame. And then, outer ring and inner rings of a spectacle rim are cut out by a CNC engraving and cutting machine. The multi-color cellulose acetate sheet is placed in the cooling liquid for cooling, so that the multi-color cellulose acetate sheet is hardened to achieve the purpose of curing the multi-color cellulose acetate sheet. And finally, the spectacle frame fittings are mounted on the formed spectacle rim. The color of the multi-color cellulose acetate sheet is firstly adjusted, and then outer ring and inner rings are cut out, which saves the working process that the burrs and deformation of the outer ring caused during the pressing after cutting the outer ring are repaired in the later stage. And, the whole multi-color cellulose acetate sheet is pressed by an oil pressing machine, which can make the pressing for the multi-color cellulose acetate sheet more uniformly and the highlighting of the color of the middle layer more uniformly. Finally, the cut multi-color cellulose acetate sheet is cooled, so that the multi-color cellulose acetate spectacle frame is molded, thereby avoiding the stress and deformation during mounting. The adjustment process for the deformation caused by pressing is saved by changing the process order, which reduces the production cost, and a cooling process is added to mold the spectacle rim, which avoids the deformation during the process of mounting fittings in the later stage, thereby improving the qualification rate of product.

BRIEF DESCRIPTION OF THE DRAWINGS

FIG. 1 is a flow chart of a method for fabricating a multi-color cellulose acetate spectacle frame according to the present invention.

DETAILED DESCRIPTION

The present invention will be further described and explained below in combination with the specific embodiments and the accompanying drawings of the description.

Referring to FIG. 1, a multi-color cellulose acetate sheet is provided. The multi-color cellulose acetate sheet is composed of multiple layers in its thickness direction, each layer having a color.

An oil pressing die is designed and made.

The multi-color cellulose acetate sheet is placed in an oven for first baking, the baking temperature is 200-210° C., and the baking time is 30-40 seconds, so that the multi-color cellulose acetate sheet is softened.

The multi-color cellulose acetate sheet is placed in an oil pressing die mounted on an oil pressing machine, so as to enable the second, third, and fourth color layers of the multi-color cellulose acetate sheet to move a distance greater than the thickness of a surface color layer of the multi-color cellulose acetate sheet by the oil pressing machine.

A surface layer of the excessively moved portion is ground off or shaved off by a water grinder, so that the color of a middle layer is highlighted after the surface layer is removed.

The processed multi-color cellulose acetate sheet is placed in the oven for second baking, the baking temperature is 210-250° C., and the baking time is 50-70 seconds, so that the multi-color cellulose acetate sheet is softened, and the softened multi-color cellulose acetate sheet is softer than that obtained through the first baking, and thus may be pressed better.

The baked multi-color cellulose acetate sheet is placed in a precision pressing die of a hydraulic press for pressing, so as to enable the moved portion of the multi-color cellulose acetate sheet to move a certain distance again; at this point, the moved distance is less than the thickness of the middle layer, so that the color of the middle layer is further mixed with the color of the surface layer not removed, highlighting the color of the middle layer.

The multi-color cellulose acetate sheet is placed in a cooling liquid for cooling; the cooling liquid is water, and the multi-color cellulose acetate sheet is molded, so that each of the color layers is cured.

The multi-color cellulose acetate sheet is cut by a CNC engraving and cutting machine. That is, an outer ring of a spectacle rim is formed through cutting.

Inner rings of the multi-color cellulose acetate sheet are cut out by the CNC engraving and cutting machine. That is, inner rings of a spectacle rim are formed through cutting.

The multi-color cellulose acetate sheet is placed in the cooling liquid for cooling again, so that the molded spectacle rim is cured.

The spectacle frame fittings are mounted on the formed spectacle rim.

In the above solution, a multi-color cellulose acetate sheet is firstly baked so that it is softened; then, the multi-color cellulose acetate sheet is placed in an oil pressing die mounted on an oil pressing machine, so as to enable the second, third, and fourth color layers of the multi-color cellulose acetate sheet to move a distance greater than the thickness of a surface color layer of the multi-color cellulose acetate sheet. A surface layer of the excessively moved portion is ground off so that the color of a middle layer is highlighted. The multi-color cellulose acetate sheet is baked again so that it is softened. The multi-color cellulose acetate sheet is pressed by a precision pressing die so that the color of the middle layer is highlighted to the surface of the spectacle frame. Outer ring and inner rings of the spectacle rim are then cut out by a CNC engraving and cutting machine. The multi-color cellulose acetate sheet is cooled in a cooling liquid, so that the multi-color cellulose acetate sheet is hardened to achieve the purpose of curing the multi-color cellulose acetate sheet. And finally, spectacle frame fittings are mounted on the formed spectacle rim. The color of the multi-color cellulose acetate sheet is firstly adjusted, and then outer ring and inner rings are cut out, which saves the working process that the burrs and deformation of the outer ring caused during the pressing after cutting the outer ring are repaired in the later stage. And, the whole multi-color cellulose acetate sheet is pressed by an oil pressing machine, which can make the pressing for the multi-color cellulose acetate sheet more uniformly and the highlighting of the color of the middle layer more uniformly. Finally, the cut multi-color cellulose acetate sheet is cooled, so that the multi-color cellulose acetate spectacle frame is molded, thereby avoiding the stress and deformation during mounting. The adjustment process for the deformation caused by pressing is saved by changing the process order, which reduces the production cost, and a cooling process is added to mold the spectacle rim, which avoids the deformation during the process of mounting fittings in the later stage, thereby improving the qualification rate of product.

Finally, it should be noted that the above-mentioned embodiments are only intended to illustrate the technical solution of the present invention, and are not intended to limit the scope of the present invention. Although the present invention is described in detail with reference to the preferred embodiments, it should be understand by those ordinary skilled in the art that various modifications and equivalents can be made to the technical solution of the present invention without departing from the spirit and scope of the technical solution of the present invention.

What is claimed is:

1. A method for fabricating a multi-color cellulose acetate spectacle frame, the method comprising:
    providing a multi-color cellulose acetate sheet having color layers with specific thicknesses, wherein the multi-color cellulose acetate sheet includes multiple layers in its thickness direction, each layer having a color;
    designing and making an oil pressing die;
    placing the multi-color cellulose acetate sheet in an oven for first baking;
    placing the multi-color cellulose acetate sheet in the oil pressing die mounted on an oil pressing machine, so as to enable second, third, and fourth color layers of the multi-color cellulose acetate sheet to move a distance greater than the thickness of a surface color layer of the multi-color cellulose acetate sheet by the oil pressing machine;
    grinding off or shaving off a surface layer of an excessively moved portion by a water grinder;
    placing the processed multi-color cellulose acetate sheet in the oven for second baking;

placing the baked multi-color cellulose acetate sheet in a precision pressing die of a hydraulic press for pressing, so as to enable the moved portion of the multi-color cellulose acetate sheet to move a certain distance again;

placing the multi-color cellulose acetate sheet in a cooling liquid for first cooling;

cutting the multi-color cellulose acetate sheet by a CNC engraving and cutting machine;

cutting inner rings of the multi-color cellulose acetate sheet by the CNC engraving and cutting machine to form a spectacle rim;

placing the multi-color cellulose acetate sheet in the cooling liquid for second cooling; and mounting spectacle frame fittings on the formed spectacle rim.

2. The method for fabricating the multi-color cellulose acetate spectacle frame according to claim 1, wherein the first baking temperature is 200-210° C., and the baking time is 30-40 seconds.

3. The method for fabricating the multi-color cellulose acetate spectacle frame according to claim 2, wherein the moved distance of the multi-color cellulose acetate sheet after being pressed in the precision pressing die is less than a thickness of the middle layer to be highlighted.

4. The method for fabricating the multi-color cellulose acetate spectacle frame according to claim 2, wherein the cooling liquid is water.

5. The method for fabricating the multi-color cellulose acetate spectacle frame according to claim 1, wherein the second baking temperature is 210-250° C., and the baking time is 50-70 seconds.

6. The method for fabricating the multi-color cellulose acetate spectacle frame according to claim 5, wherein the moved distance of the multi-color cellulose acetate sheet after being pressed in the precision pressing die is less than a thickness of the middle layer to be highlighted.

7. The method for fabricating the multi-color cellulose acetate spectacle frame according to claim 5, wherein the cooling liquid is water.

8. The method for fabricating the multi-color cellulose acetate spectacle frame according to claim 1, wherein the moved distance of the multi-color cellulose acetate sheet after being pressed in the precision pressing die is less than a thickness of the middle layer to be highlighted.

9. The method for fabricating the multi-color cellulose acetate spectacle frame according to claim 1, wherein the cooling liquid is water.

* * * * *